United States Patent
Olsson

(10) Patent No.: US 9,004,268 B2
(45) Date of Patent: Apr. 14, 2015

(54) CONVEYING SYSTEM, TOWER STRUCTURE WITH CONVEYING SYSTEM, AND METHOD FOR CONVEYING CONTAINERS WITH A CONVEYING SYSTEM

(75) Inventor: Ake Olsson, Oppdal (NO)

(73) Assignee: Plantagon International AB, Stockholm (SE)

( * ) Notice: Subject to any disclaimer, the term of this patent is extended or adjusted under 35 U.S.C. 154(b) by 142 days.

(21) Appl. No.: 13/321,868

(22) PCT Filed: May 27, 2009

(86) PCT No.: PCT/SE2009/000272
§ 371 (c)(1),
(2), (4) Date: Nov. 28, 2011

(87) PCT Pub. No.: WO2010/138027
PCT Pub. Date: Dec. 2, 2010

(65) Prior Publication Data
US 2012/0060414 A1 Mar. 15, 2012

(51) Int. Cl.
*B65G 21/18* (2006.01)
*A01G 9/14* (2006.01)
*B65G 25/04* (2006.01)
*B65G 25/10* (2006.01)

(52) U.S. Cl.
CPC ............. *B65G 21/18* (2013.01); *A01G 9/143* (2013.01); *B65G 25/04* (2013.01); *B65G 25/10* (2013.01); *B65G 2207/24* (2013.01)

(58) Field of Classification Search
CPC ..... B65G 21/18; B65G 2207/24; B65G 21/10
USPC .............................................. 198/750.1; 47/65
See application file for complete search history.

(56) References Cited

U.S. PATENT DOCUMENTS

| | | | | |
|---|---|---|---|---|
| 3,826,349 A | * | 7/1974 | Stevenson, III | 198/744 |
| 4,075,949 A | | 2/1978 | Davis et al. | |
| 4,102,449 A | | 7/1978 | Shufran | |
| 4,299,323 A | | 11/1981 | Koch et al. | |
| 4,351,429 A | * | 9/1982 | Garvey | 198/690.2 |
| 4,364,471 A | * | 12/1982 | Furlette et al. | 198/751 |

(Continued)

FOREIGN PATENT DOCUMENTS

| | | |
|---|---|---|
| DE | 3330620 A1 | 3/1985 |
| EP | 0691293 A1 | 1/1996 |

(Continued)

*Primary Examiner* — Gene Crawford
*Assistant Examiner* — Thomas Randazzo
(74) *Attorney, Agent, or Firm* — Raymond R. Ferrera; Adams and Reese LLP

(57) ABSTRACT

The invention relates to a conveying system for moving containers (14), the conveying system (4) comprising an inclined track (8) and a conveying device (24), where the track (8) has an container inlet (11) at the bottom (12) and an container outlet (15) at the top (16) and where the conveying device (24) is arranged to travel down (R) the track (8) and comprises a container moving unit (54) which after passage below a container (14) moves the container (14) one step up (L) the track (8), the conveying device (24) thus moving one container (14) at a time one step up (L) the track (8) during the downward (R) travel of the conveying device (24). The invention also relates to a tower structure (2) comprising a container conveying system (4), and a method for conveying containers (14) with a conveying system (4).

9 Claims, 3 Drawing Sheets

(56) References Cited

U.S. PATENT DOCUMENTS

| | | | |
|---|---|---|---|
| 4,399,907 A | | 8/1983 | Wiknich et al. |
| 4,549,363 A | * | 10/1985 | Buonicore ................ 34/216 |
| 4,844,239 A | * | 7/1989 | Norbut .................... 198/842 |
| 4,879,841 A | | 11/1989 | Sjostrand |
| 5,913,655 A | * | 6/1999 | Maday ................. 414/797.2 |
| 6,612,798 B2 | * | 9/2003 | de Jong ................... 414/276 |
| 7,963,389 B2 | * | 6/2011 | Broers et al. ............ 198/838 |
| 8,276,746 B2 | * | 10/2012 | Klotzki .................. 198/778 |
| 8,322,282 B2 | * | 12/2012 | Burgess et al. ........... 101/477 |

FOREIGN PATENT DOCUMENTS

| | | |
|---|---|---|
| EP | 1 407 987 A1 | 4/2004 |
| EP | 1 980 506 A2 | 10/2008 |
| GB | 922293 * | 3/1963 |
| GB | 922293 A | 3/1963 |
| JP | 563290 | 1/1981 |
| JP | 58162440 A | 9/1983 |
| JP | 2002-120925 A | 4/2002 |
| JP | 2007-131359 A | 5/2007 |
| KR | 10-2009-0124475 A | 12/2009 |

\* cited by examiner

CONVEYING SYSTEM, TOWER STRUCTURE WITH CONVEYING SYSTEM, AND METHOD FOR CONVEYING CONTAINERS WITH A CONVEYING SYSTEM

TECHNICAL FIELD OF THE INVENTION

The present invention relates to a conveying system, a tower structure comprising a conveying system, and a method for conveying containers with a conveying system.

TECHNICAL BACKGROUND

When cultivating plants, the plants are e.g. cultivated in greenhouses having transparent walls and roofs. Plants are placed in e.g. troughs on the greenhouse floors which troughs are removed from the greenhouse when the plants are ready for shipping to e.g. customers. In order to simplify the transport of the troughs it is known to use conveying systems in the greenhouses.

A conveying system for conveying of plants is shown in EP 1 407 987 A1.

A device for assisting the growth of plants is shown in GB 922 293, where the device comprises a tower structure occupying little space where containers are fed in at an inlet at the top of the structure, and transported along guiding means to an outlet at the bottom of the structure, where the guiding means is a track arranged spirally within the structure around a central pillar. An elevator is provided for feeding the containers to the inlet.

A problem with conveying systems of the above mentioned kind is that they require a relatively powerful motor as they move all the troughs at the same time.

SUMMARY OF THE INVENTION

The problem of conveying systems requiring a relatively powerful motor is solved according to the invention as disclosed in the present claims by arranging a conveying system, a tower structure comprising a conveying system, and a method for conveying containers with a conveying system.

The conveying system, tower structure and conveying method of the present claims comprise an inclined track and a conveying device arranged to travel down the track, the conveying device comprising a container moving unit moving only one container at a time only one step up the track during the downward travel of the conveying device, the advantage of achieving a conveying system only requiring a relatively small motor and occupying little space is attained when at the same time it is possible to keep substantially all of the track occupied with containers at any given time.

BRIEF DESCRIPTION OF DRAWINGS

The invention will be described in more detail below with reference to the accompanying drawings, where same reference numerals are used for similar parts, and in which.

DESCRIPTION OF PREFERRED EMBODIMENTS

Figure 1:
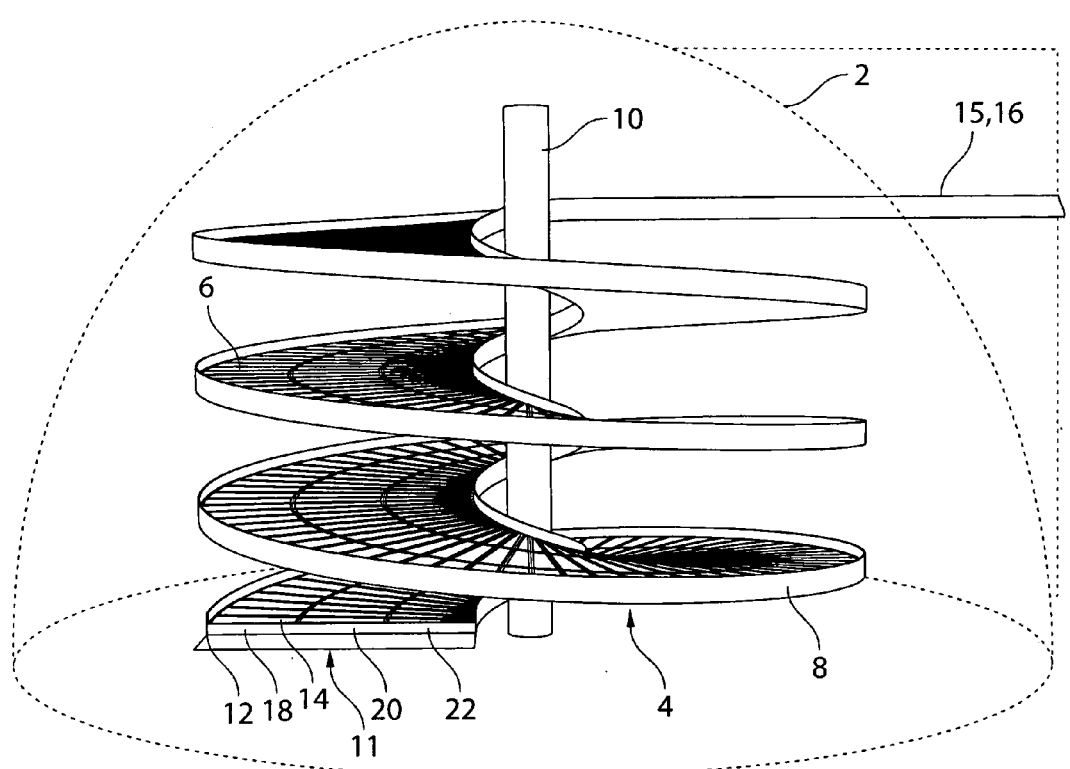
FIG. 1 shows schematically a view of a tower structure and a conveying system.

FIG. 1 shows schematically a view of a tower structure 2 and a conveying system 4 for plants 6. As can be seen from the figure, the conveying system 4 comprises a track 8 arranged, preferably spirally, inclined within the tower structure 2. Preferably, a pillar 10 is arranged to support the track 8, e.g by that the track 8 is spirally arranged around and fixed to a central pillar 10 within the tower structure 2. The tower structure 2 preferably has a substantially transparent surface similar to that of a greenhouse in order for sun light to be able to reach the plants 6 within the tower structure 2, e.g a frame having glass panels inserted therein. The tower structure 2 may be dome shaped as shown in the figure or have another more polygonal shape more similar to that of a traditional greenhouse. As is shown in the figure, plants 6 to be grown are inserted at a container inlet 11 at the bottom 12 of the track 8 in containers 14, preferably having an open top such as troughs trays or the like, and are removed at a container outlet 15 at the top 16 of the track 8 using e.g. an elevator system (not shown), i.e. the plants 6 travel up along the track 8 in containers 14 which containers 14 are conveyed up the track in a way which will be described more in detail below.

As is shown in the figure, the track 8 may be arranged to convey one or more than one row 18, 20, 22 of containers 14 up the track, where the figure shows conveying of three 18, 20, 22 rows of containers abreast each other.

By that the structure 2 is tower shaped, it is possible to grow a larger number of plants per ground area than is possible in traditional greenhouses.

It is also possible to arrange within the tower structure 2 systems for e.g. irrigation, ventilation and other similar systems such as temperature and humidity control systems and systems for introducing growth-promoting material and insecticides that are commonly used in greenhouses. Preferably the above mentioned pillar 10 is hollow, whereby the above mentioned systems may at least partly be arranged within the pillar 10 in order to protect these systems.

Figure 2:
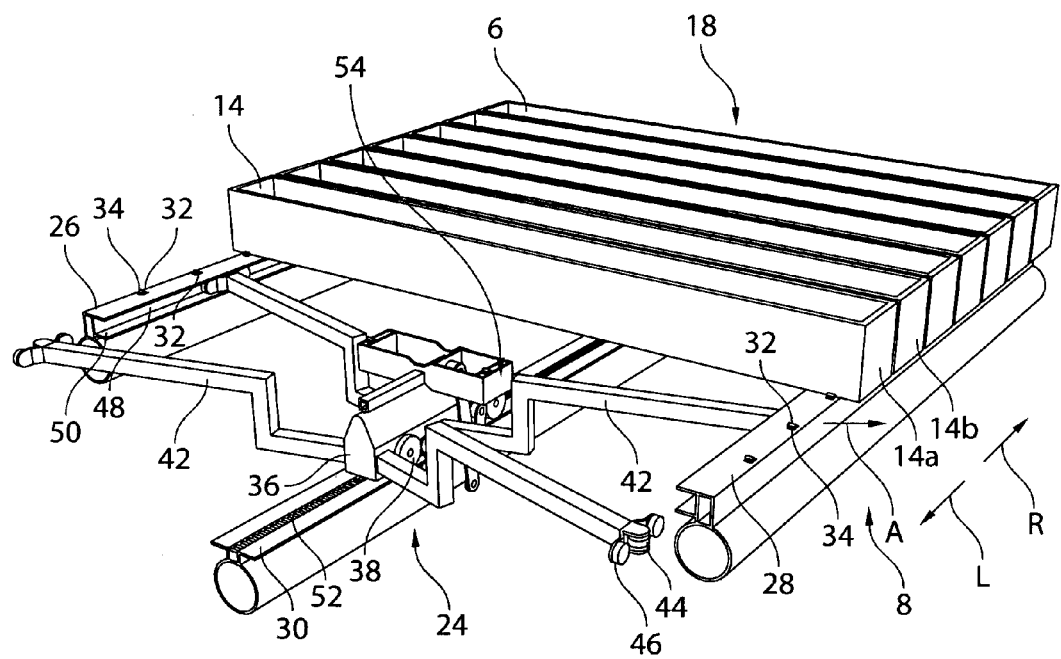
FIG. 2 shows schematically a view of a conveying device according to a first embodiment of the invention.

FIG. 2 shows schematically a view of a conveying device 24 according to a first embodiment of the invention. In the figure is shown an embodiment where the track 8 is arranged to convey only one row 18 of containers 14 up the track 8, but by arranging several conveying devices 24 abreast of each other, more than one row 18 of containers 14 may be conveyed up the track 8 as is shown in FIG. 1.

As can be seen in FIG. 2, the track 8 comprises two guides 26, 28 and one beam 30 for each row 18 of containers 14, where the two guides 26, 28 are arranged to support the containers 14. The conveying device 24 is driven on the beam 30 and is also preferably supported on the two guides 26, 28 in order to keep the conveying device 24 on the track 8. The guides 26, 28 and the beam 30 are preferably fixed to a central pillar (not shown) as mentioned above.

A very important advantage of the invention is that the containers 14 may be conveyed up the track 8 using a low power motor. This is achieved by moving one container 14 one step at a time up the track 8 by which a container 14 can be conveyed the whole way from the bottom of the track 8 to the top of the track 8 during such a period of time which is needed for the plants 6 to get ready for delivery as will be described in more detail below. In this way, the plants 6 are maintained under ideal conditions and protected during their initial growth phase.

The conveying device 24 moves one container 14 one step at a time, by that the conveying device starts from the top of the track 8 and thereafter works its way down the track 8 and at the same time when passing below a container 14 moves the container 14 one step up the track 8 as is described in more detail below. When the conveying device 24 has reached the bottom of the track 8, the container moving unit is kept retracted so that the conveying device 24 may move below the containers 14 all the way to the top of the track 8, whereafter the conveying device 24 yet again begins to work its way down the track 8 as described above.

The track 8 comprises, as mentioned above, two guides 26, 28 on which the containers 14 are supported, and a beam 30. As the track 8 is inclined and slopes down to the right R in the figure, carriers 32 are arranged on the guides 26, 28 in order to prevent the containers 14 from sliding down the track 8 (to the right R as seen in the figure). In order to be able to push the containers 14 past the carriers 32 up the track 8 (to the left L as seen in the figure) the carriers 32 are pivotably fixed around a pivot axis A to the guides 26, 28 and are provided with e.g. springs or counterweights which push the carrier ends 34 out from the surface of the guides 26, 28. Thus, the carriers 32 are similar to rocker arms. The carrier ends 34 are pushed into the guides 26, 28 with a pivoting movement up the track 8 by the containers 14 as the containers 14 pass over the carriers 32, and are thereafter again pushed out from the guides 26, 28 with a pivoting movement down the track 8 by the influence of the springs or counterweights when the container 14 has passed the carrier ends 34, whereby the carriers 32 prevent the containers 14 from sliding down the track 8.

The beam 30 is arranged between, and vertically below, the guides 26, 28. The conveying device 24 comprises a travelling carriage 36 with wheels 38 which wheels 38 are supported against and roll on the beam 30. Side supporting wheels 40 are arranged on the travelling carriage 36 and protrude down adjacent to the beam 30 in order to prevent the travelling carriage 36 from falling off the beam 30. The travelling carriage 36 is provided with supporting arms 42 that support against the guides 26, 28 in order to further stabilize the travelling carriage 36 so that it will not fall off the beam 30. The supporting arms 42 are preferably provided with wheels 44, 46 that support against vertical surfaces 48 and horizontal surfaces 50 respectively of the guides 26, 28. The travelling carriage 36 and its supporting arms 42 are at any time positioned below the bottom surface of the containers 14 and may thus travel below the containers 14 without coming into contact with these. The travelling carriage 36 is arranged with at least one drive wheel, e.g. a toothed wheel, preferably arranged inside the travelling carriage 36 as will be shown below which wheel rolls along the beam 30 and comes into engagement with a toothed surface 52, e.g. a rack, on the beam 30. In this way it is possible to determine the position of the travelling carriage 36 on the beam 30, and to drive the travelling carriage 36 along the track 8.

The travelling carriage 36 moves to the right R in the figure down the track 8. When the conveying device 24 comprising the travelling carriage 36 reaches an upper container 14a on the track 8 which upper container 14a is supported by the guides 26, 28 and carriers 32, the whole of the conveying device 24 moves below the upper container 14a, i.e. whole of the container moving unit 54 arranged on the travelling carriage 36 passes below the upper container 14a when the travelling carriage 36 passes below said upper container 14a. After the passage of said upper container 14a at least one engagement device 33 of the container moving unit 54 is firstly pushed up between two containers 14a, 14b and secondly pushes on the upper container 14a of said two containers 14a, 14b thereby pushing the upper container 14a one step up the track 8 past a pair of carriers 32 as described above. As described above, the carrier ends 34 prevent the upper container 14a from sliding down the track 8 after the upper container 14a has passed over the respective carrier ends 34. After this, the above process is repeated for the next container 14b. The container moving unit 54 is preferably connected to the drive wheel on the travelling carriage 36 via a link mechanism which is adjusted to the space between the respective containers 14a, 14b and the carriers 32 supporting these containers 14a, 14b, whereby the above pushing movement is executed automatically as the conveying device 24 comprising the travelling carriage 34 moves down the track 8. By the above process, the containers 14 are moved up the track one by one in a way where a moved container 14a leaves an unoccupied space with unoccupied carriers 32 on the track 8 thereby allowing the next container 14b in turn to be moved one step up the track 8 to said unoccupied space, whereby the track 8 at all times is substantially completely occupied by containers 14. When the travelling carriage 36 reaches the bottom of the track 8, the container moving unit 54 is deactivated e.g. by decoupling the container moving unit from the drive wheel whereafter the conveying device 24 may be moved all the way up the track 8 without coming into contact with containers 14. When again at the top of the track 8, the container moving unit 54 is again activated e.g. by coupling it to the drive wheel, whereafter the conveying device 24 again begins to work its way down the track 8.

Figure 3:
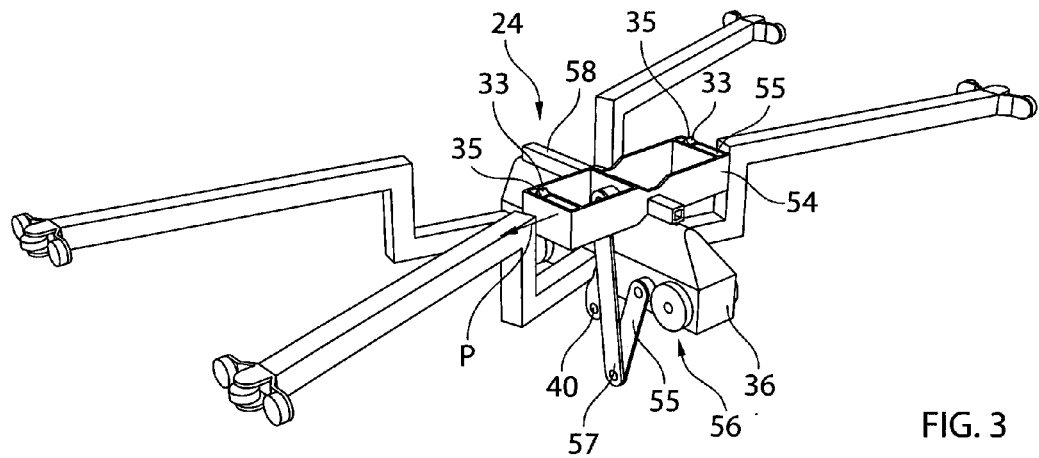
FIG. 3 shows schematically a view of the conveying device according to FIG. 2.

FIG. 3 shows schematically a view of the conveying device 24 according to FIG. 2. The figure shows an embodiment where the travelling carriage 36 has a drive wheel 56, e.g. a toothed wheel, arranged inside the travelling carriage 36 which drive wheel 56 protrudes from the under side of the travelling carriage 36. The figure also shows the container moving unit 54 that pushes the containers up the track. As can be seen from the figure, the drive wheel 56 is preferably connected to the container moving unit 54 via a link mechanism 55, 57. As the drive wheel 56 rotates, the container moving unit 54 moves back and forth along a guide unit 58 arranged on the travelling carriage 36.

As can be seen from the figure, the container moving unit 54 comprises at least one engagement device 33 of similar kind and function to the carriers that have been described for the guides, which engagement device comes into engagement with the downwards the track situated edges of the containers. Thus, in order to be able to push the container moving unit 54 past and below the containers down the track (to the right as seen in the figure) the engagement device or devices 33 are pivotably fixed around an pivot axis P to the container moving unit housing 55 and are provided with e.g. springs or counterweights which push the engagement device ends 35 out from the surface of the container moving unit housing 55. Thus, the engagement devices 33 are similar to rocker arms. The engagement device ends 35 are pushed into the container moving unit housing 55 with a pivoting movement up the track by the containers as the container moving unit 54 passes below the containers 14, and are thereafter again pushed out from the container moving unit housing 55 with a pivoting movement down the track 8 by the influence of the springs or counterweights when the engagement device ends 35 has passed the container 14, whereby the engagement devices 33 may push the containers 14 up the track.

Figure 4:
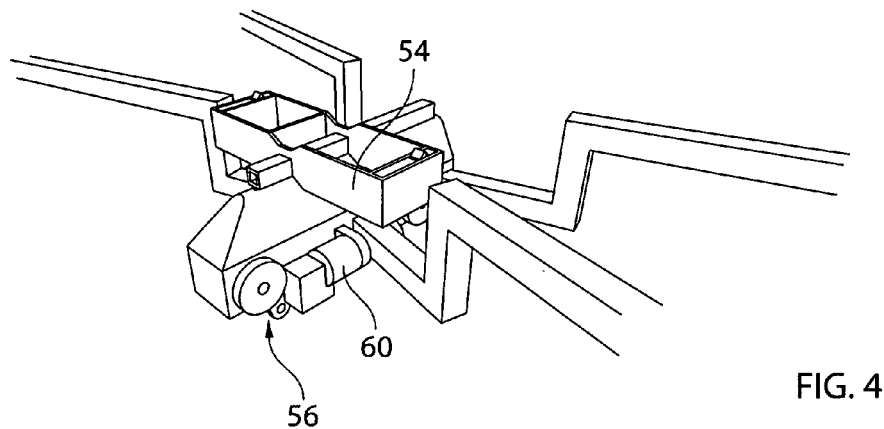
FIG. 4 shows schematically another view of the conveying device according to FIG. 3.

FIG. 4 shows schematically another view of the conveying device according to FIG. 3. According to this embodiment, a small electrical motor 60 drives the drive wheel 56 and thus also the container moving unit 54.

The invention claimed is:

1. Conveying system for moving containers, the conveying system comprising a spirally inclined track and at least one conveying device, wherein the track has a container inlet at the bottom and a container outlet at the top;

further wherein the conveying device is arranged to travel down the track and comprises a container moving unit which is configured to, after passage below a container, move the container one step up the track against the force of gravity, the conveying device thus moving one container at a time one step up the track during the downward travel of the conveying device;

wherein the track comprises two guides and a beam for each row of containers, and the two guides are arranged to support the containers and the conveying device is driven on the beam;

wherein carriers are arranged on the guides in order to prevent the containers from sliding down the track;

wherein the conveying device comprises a travelling carriage comprising a drive wheel;

wherein the drive wheel is connected to the container moving unit via a link mechanism arranged to transmit moving force to the container moving unit from the drive wheel such that the container moving unit moves back and forth relative the traveling carriage along a guide unit arranged on the travelling carriage as the drive wheel rotates;

wherein the container moving unit comprises at least one engagement device and said engagement device comes into engagement with the edges of the containers directed downwards the track during moving of the containers.

2. Conveying system as claimed in claim 1, wherein the carriers are pivotably fixed around a pivot axis to the guides in order to be able to push the containers past the carriers up the track, by that the carrier ends are arranged to be pushed into the guides with a pivoting movement up the track by the containers as the containers pass over the carriers, and are arranged to thereafter again be pushed out from the guides with a pivoting movement down the track by the influence of springs or counterweights when the container has passed the carrier ends, whereby the carriers prevent the containers from sliding down the track.

3. Conveying system as claimed in claim 1, wherein the engagement device is pivotably fixed around a pivot axis to the container moving unit housing in order to be able to push the container moving unit past and below the containers down the track, by that the engagement device ends are pushed into the container moving unit housing with a pivoting movement up the track by the containers as the container moving unit passes below the containers, and are arranged to thereafter again be pushed out from the container moving unit housing with a pivoting movement down the track by the influence of springs or counterweights when the engagement device ends has passed the container, whereby the engagement devices may push the containers up the track.

4. Conveying system as claimed in claim 1, wherein the travelling carriage is provided with wheels which wheels are supported against and roll on the beam, and that side supporting wheels are arranged on the travelling carriage and protrude down adjacent to the beam in order to prevent the travelling carriage from falling off the beam and that the travelling carriage is also provided with supporting arms that support against the guides in order to further stabilize the travelling carriage.

5. Conveying system as claimed in claim 1, wherein the conveying system is arranged to convey containers with plants.

6. Tower structure for cultivating of plants, wherein the tower structure comprises a conveying system comprising:

a spirally inclined track arranged within the tower structure and at least one conveying device, wherein the track has a container inlet at the bottom and a container outlet at the top;

wherein the conveying device is arranged to travel down the track and comprises a container moving unit which is configured to, passage below a container move the container one step up the track against the force of gravity, the conveying device thus moving one container at a time one step up the track during the downward travel of the conveying device;

wherein the track comprises two guides and a beam for each row of containers, where the two guides are arranged to support the containers and where the conveying device is driven on the beam;

wherein carriers are arranged on the guides in order to prevent the containers from sliding down the track;

wherein the conveying device comprising a travelling carriage comprising a drive wheel;

wherein the drive wheel is connected to the container moving unit via a link mechanism arranged to transmit moving force to the container moving unit from the drive wheel such that the container moving unit moves back and forth relative the traveling carriage along a guide unit arranged on the travelling carriage as the drive wheel rotates;

wherein the container moving unit comprises at least one engagement device which engagement device comes into engagement with the edges of the containers directed downwards the track during moving of the containers.

7. Tower structure as claimed in claim 6, wherein the tower structure is substantially transparent in order for sun light to be able to reach the plants.

8. Tower structure as claimed in claim 6, wherein a pillar is arranged within the tower structure and that the track is carried by the pillar and arranged spirally inclined around the pillar.

9. Method for conveying containers with a conveying system comprising an inclined track and a conveying device, wherein the track has an container inlet at the bottom and an container outlet at the top;

wherein the conveying device comprises a container moving unit, a travelling carriage comprising a drive wheel, said drive wheel being connected to the container moving unit via a link mechanism arranged to transmit moving force to the container moving unit from the drive wheel such that the container moving unit moves back and forth relative the traveling carriage along a guide unit arranged on the travelling carriage as the drive wheel rotates, where the method comprises the steps of:

moving the conveying device down the track below an upper container supported by guides and carriers arranged on the track;

pushing up at least one engagement device of a container moving unit arranged on the conveying device between two containers after the passage of said upper container, pushing on the upper container of said two containers thereby pushing the upper container one step up the track against the force of gravity past a pair of carriers arranged on the guides, the carriers comprising carrier ends preventing the container from sliding down the track after the container has passed over the respective carrier ends; and repeating the above steps for the next container, the conveying device thus moving one container at a time one step up the track during the downward travel of the conveying device.

* * * * *